June 14, 1949. R. W. S. BODEN 2,473,411
EGG SEPARATOR STAND
Filed March 12, 1947
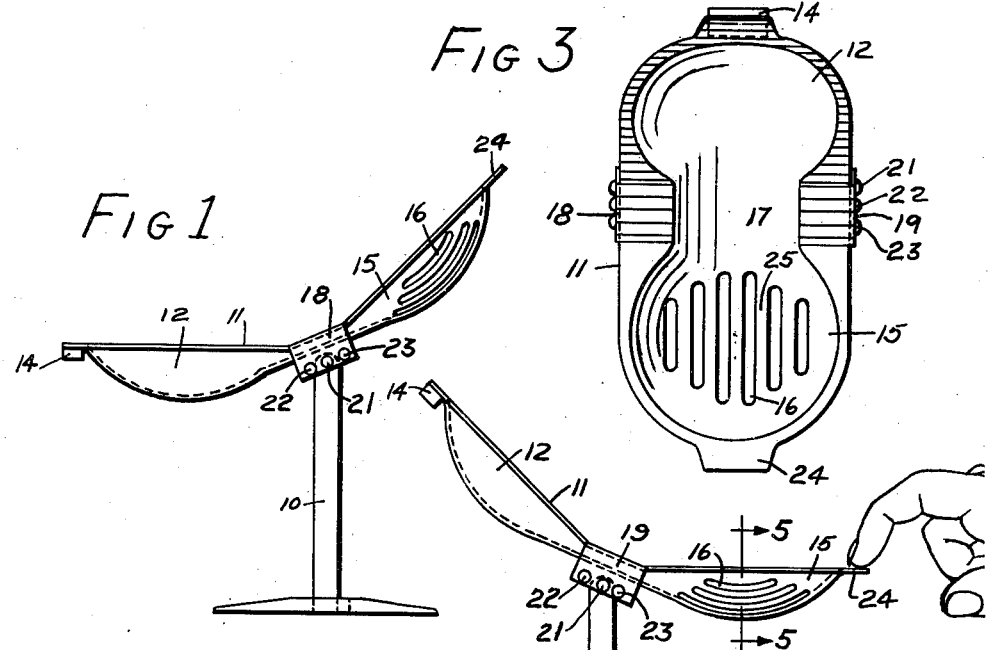
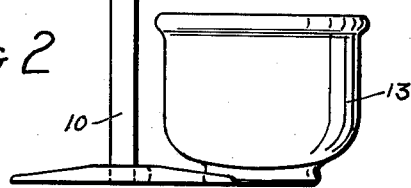
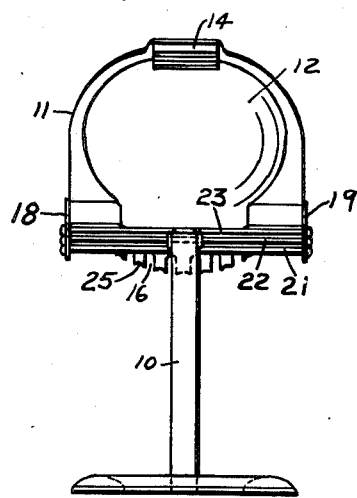
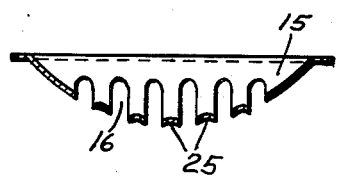
INVENTOR.
ROBERT W. S. BODEN
BY *Victor J. Evans & Co.*
ATTORNEYS Patented June 14, 1949

2,473,411

UNITED STATES PATENT OFFICE 2,473,411

EGG SEPARATOR STAND

Robert W. S. Boden, Pittsburgh, Pa.

Application March 12, 1947, Serial No. 734,133

1 Claim. (Cl. 146—2)

This invention relates to an egg yolk and white separator.

It is an object of the present invention to provide a yolk and white separator which is of simple construction, inexpensive to manufacture and efficient in operation.

It is another object of the invention to provide a separator for yolks and whites of eggs which is carried upon a pedestal so that it can be tilted from one position where the egg is received to another position where the egg yolk is separated from the white, the white being permitted to pour through openings in the bottom of the separator and at a time after the egg has been opened and examined on a portion of the separator not containing the openings so that the bad eggs can be determined before they near the portion of the separator containing the openings and where the separating action is effected.

For other objects and for a better understanding of the invention, reference may be had to the following detailed description taken in connection with the accompanying drawing, in which:

Figure 1 is a side elevational view of the separator with the tray tilted to a position for receiving the combined yolk and white.

Figure 2 is an elevational view with the tray tilted to strain the white from the yolk and to shift the egg from the receiving portion to the strainer portion.

Figure 3 is a top plan view looking upon the tray and showing the connection between the egg receiving and straining portions along which the combined yolk and white is transferred to effect a straining action.

Figure 4 is an end elevational view looking from right to left in Figure 2 and upon the tilted egg receiving portion.

Figure 5 is a cross sectional view taken on line 5—5 of Figure 2 and looking in the direction of the arrows thereof.

Referring now to the figures, 10 represents a pedestal on which is pivotally mounted a tray 11 formed according to the present invention. This tray has a dished portion 12 into which the combined yolk and white is disposed for examination to determine whether the egg is good or bad at a location removed from the top of a vessel 13 which is to receive the egg whites. This portion 12 has a handle 14 thereon by which the tray can be lifted upwardly to tilt the same from the position shown in Figure 1 to the position shown in Figure 2. On the opposite end of the tray is a dished strainer portion 15 having openings 16 therein. Between the receiving portion and the strainer portion is a passage 17 over which the combined egg yolk and white is passed. The white will be drained from the yolk and thereafter the yolk can be returned to the portion 12 for removal or it may be removed directly from the strainer portion 15. Adjacent the passage 17 and at opposite sides thereof are respectively depending portions or flanges 18 and 19 through which are extended a shaft and pins 21, 22 and 23. The intermediate shaft 21 serves as the pivot connection for the tray with the upper end of the pedestal 10. The other two pins serve as stops to limit the tilting movement of the tray. These pins engage with the sides of the pedestal 10 thereby to limit the tilting movement of the tray.

The strainer portion 15 also has a handle portion 24 which can be depressed by the operator's finger as shown in Figure 2 at times when it is being tilted from the position shown in Figure 1 to the position shown in Figure 2.

Between the openings 16 in the strainer portion are bars 25 which are rounded so as to curve downwardly to facilitate the passage of the egg white therethrough. Each of the portions 12 and 15 are concaved to provide adequate depth for retaining the egg yolk and white.

While various changes may be made in the detailed construction it shall be understood that such changes shall be within the spirit and scope of the present invention as defined by the appended claim.

I claim:

In an egg separating stand, the combination which comprises a pedestal having a stem and a base for holding the stem upright, a tray having a dished egg holding section in one end and a straining section in the other end with the straining section also dished and provided with openings and extended diagonally in relation to the said egg holding section, said tray having downwardly extending flanges at the sides overlapping the upper end of the pedestal for pivotally mounting the tray on the pedestal, and pins extended through the flanges spaced from the shaft and positioned to engage the sides of the pedestal to limit tilting movement of the tray.

ROBERT W. S. BODEN.

REFERENCES CITED

The following references are of record in the file of this patent:

UNITED STATES PATENTS

| Number | Name | Date |
|---|---|---|
| 648,598 | Salomon | May 1, 1900 |
| 743,474 | Evert | Nov. 10, 1903 |
| 1,262,420 | Wicke | Apr. 9, 1918 |
| 1,533,377 | Bruffee | Apr. 14, 1925 |
| 1,865,745 | Grangle | July 5, 1932 |
| 1,896,498 | Taniguchi | Feb. 7, 1933 |
| 2,060,683 | Mohr | Nov. 10, 1936 |